United States Patent
Gauthier et al.

(10) Patent No.: US 6,814,485 B2
(45) Date of Patent: Nov. 9, 2004

(54) ON-DIE THERMAL MONITORING TECHNIQUE

(75) Inventors: Claude R. Gauthier, Cupertino, CA (US); Gin S. Yee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/349,645

(22) Filed: Jan. 23, 2003

(65) Prior Publication Data

US 2004/0146086 A1 Jul. 29, 2004

(51) Int. Cl.⁷ .................................................. G01K 7/00
(52) U.S. Cl. ........................... 374/170; 374/1; 331/66; 327/513
(58) Field of Search .......................... 327/538, 540, 327/541, 543, 512–513; 323/313; 374/170–171, 1, 163, 178; 257/469–470, 467; 331/66, 176, 74; 377/25; 438/54

(56) References Cited

U.S. PATENT DOCUMENTS

| 4,165,642 A | * | 8/1979 | Lipp .......................... 374/170 |
| 4,443,117 A | * | 4/1984 | Muramoto et al. ......... 374/171 |
| 4,602,871 A | * | 7/1986 | Hanaoka ..................... 374/171 |
| 5,100,829 A | * | 3/1992 | Fay et al. .................... 374/178 |
| 5,899,570 A | * | 5/1999 | Darmawaskita et al. .... 374/170 |
| 5,966,035 A | * | 10/1999 | Lien ............................. 327/89 |
| 6,476,663 B1 |  | 11/2002 | Gauthier et al. ............ 327/513 |
| 2001/0021217 A1 | * | 9/2001 | Gunther et al. ............. 374/178 |
| 2003/0082842 A1 | * | 5/2003 | Hwu et al. ................... 257/467 |
| 2003/0155903 A1 | * | 8/2003 | Gauthier et al. ......... 324/76.41 |
| 2003/0155964 A1 | * | 8/2003 | Gauthier et al. ........... 327/540 |
| 2003/0156622 A1 | * | 8/2003 | Gold et al. ................. 374/170 |
| 2003/0158683 A1 | * | 8/2003 | Gauthier et al. ............. 702/99 |

* cited by examiner

Primary Examiner—Stephen D. Meier
Assistant Examiner—Stanley J. Pruchnic, Jr.
(74) Attorney, Agent, or Firm—Osha & May L.L.P.

(57) ABSTRACT

A method and apparatus for monitoring a temperature on an integrated circuit that includes a thin gate oxide transistor. A temperature monitoring system that includes a thick gate oxide transistor is provided. The temperature monitoring system includes a temperature independent voltage generator, a temperature dependent voltage generator that includes a thick gate oxide transistor, and a quantifier operatively connected to the temperature independent voltage generator and temperature dependent voltage generator.

25 Claims, 5 Drawing Sheets

US 6,814,485 B2

ON-DIE THERMAL MONITORING TECHNIQUE

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system (10) having a microprocessor (12), memory (14), integrated circuits (ICs) (16) that have various functionalities, and communication paths (18), i.e., buses and wires, that are necessary for the transfer of data among the aforementioned components of the computer system (10).

Circuit elements in a microprocessor (12), and more generally, an IC (16), continue to get smaller. Accordingly, more and more circuit elements may be packed into an IC (16). In FIG. 2, a cross sectional diagram of a particular type of circuit element, a p-channel transistor (200), is shown. The p-channel transistor (200) includes two n+ regions (204, 206) implanted in a p-substrate (210) or a p-well. The two n+ regions (204, 206) form a drain and source region for the p-channel transistor (200). The depth of the drain and source regions may determine a junction (209) thickness for current to flow from one n+ region (204 or 206), through a channel formed below a gate (202) when the transistor (200) is "on," to the other n+ region (206 or 204). A source contact (212) and drain contact (214) allow a connection with the n+ regions (204, 206), respectively. The p-channel transistor (200) is separated from other devices by a field oxide (230, 232).

The p-channel transistor (200) is controlled by a voltage potential on a gate (202). A gate contact (216) allows a connection with the gate (202). The gate (202) is separated from the p-substrate (210) by a gate oxide (208).

A voltage potential difference between the source contact (212) and drain contact (214) is denoted $V_{ds}$. A voltage potential difference between the gate contact (216) and the source contact (212) is denoted $V_{gs}$. The voltage potential to turn the p-channel transistor (200) "on," i.e., allow the p-channel transistor (200) to conduct current, is a threshold voltage potential denoted $V_t$.

FIG. 3 shows a diagram of a current-voltage characteristic for a typical metal-oxide transistor. As shown in FIG. 3, the p-channel transistor (200 shown in FIG. 2) is "off" when $|V_{gs}|<|V_t|$ (255). The p-channel transistor (200 shown in FIG. 2) is "on" and in a linear region of operation when $|V_{ds}|\leq|V_{gs}-V_t|$ and $|V_{gs}|\geq|V_t|$ (265). The p-channel transistor (200 shown in FIG. 2) is "on" and in a saturation region of operation when $|V_{ds}|>|V_{gs}-V_t|$ and $|V_{gs}|\geq|V_t|$ (275).

As circuit elements in an IC (16 shown in FIG. 1) continue to get smaller, features of the circuit elements, e.g., the gate oxide thickness, the depth of the two n+ regions (204, 206 shown in FIG. 2), the spacing between the two n+ regions (204, 206 shown in FIG. 2), etc., get smaller.

SUMMARY OF INVENTION

According to one aspect of the present invention, an apparatus comprising an integrated circuit where the integrated circuit comprises a thin gate oxide transistor; and a temperature monitoring system disposed on the integrated circuit comprising a first temperature independent voltage generator, a first temperature dependent voltage generator where the first temperature dependent voltage generator comprises a thick gate oxide transistor; and a first quantifier operatively connected to the first temperature independent voltage generator and the first temperature dependent voltage generator.

According to one aspect of the present invention, a method for monitoring temperature comprising generating a first temperature dependent voltage potential using at least one thick gate oxide transistor disposed on an integrated circuit having disposed thereon at least one thin gate oxide transistor; generating a first temperature independent voltage potential; and monitoring a temperature of the integrated circuit by operatively comparing the first temperature independent voltage potential and the first temperature dependent voltage potential.

According to one aspect of the present invention, an apparatus comprising means for computing a logic operation on an integrated circuit wherein the integrated circuit comprises a thin gate oxide transistor; means for generating a first temperature independent voltage potential; means for generating a first temperature dependent voltage potential using at least one thick gate oxide transistor; and means for operatively comparing the first temperature independent voltage potential and the first temperature dependent voltage potential to monitor a temperature of the integrated circuit.

According to one aspect of the present invention, an apparatus comprising an integrated circuit where the integrated circuit comprises a thin junction thickness transistor and a thick junction thickness transistor; and a temperature monitoring system disposed on the integrated circuit comprising a temperature independent voltage generator, a temperature dependent voltage generator, wherein the temperature dependent voltage generator comprises a thick junction thickness transistor; and a quantifier operatively connected to the temperature independent voltage generator and the temperature dependent voltage generator.

Other aspects and advantages of the invention will be apparent from the following description and the appended claims.

DETAILED DESCRIPTION

Figure 1:
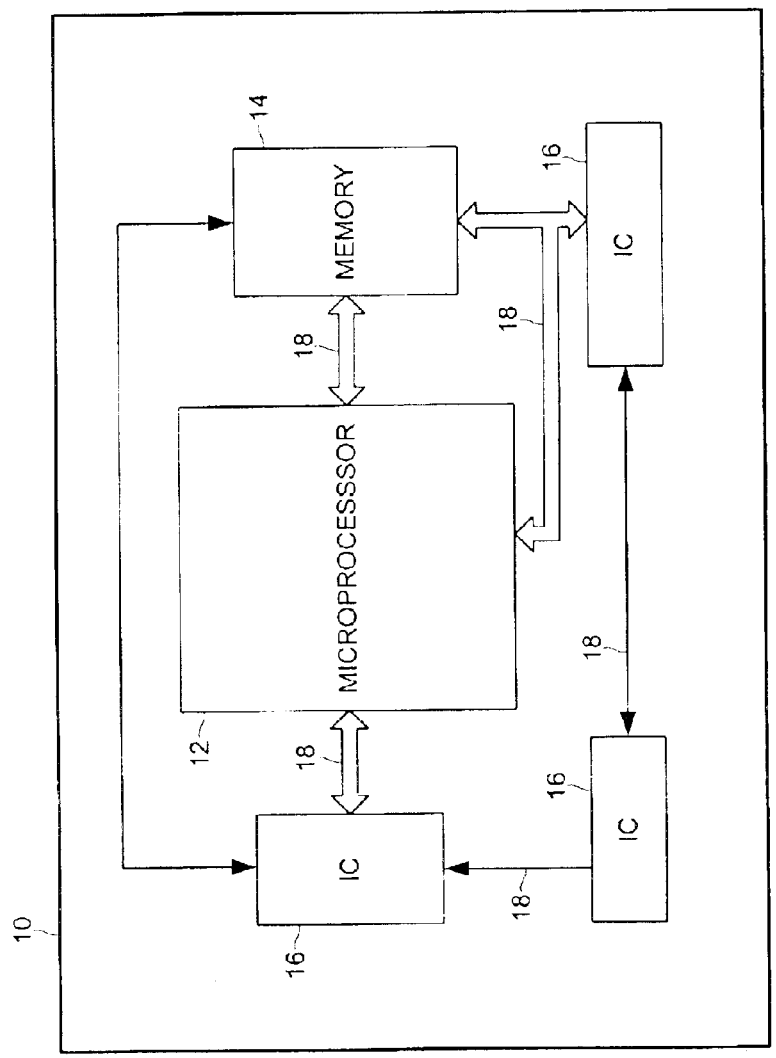
FIG. 1 shows a diagram of a typical computer system.

Embodiments of the present invention relate to a method and apparatus for using thick gate oxide thickness and/or thick junction thickness transistors in a temperature monitoring system in an integrated circuit that also uses thin gate oxide thickness and/or thin junction thickness transistors. Like elements in various figures are denoted by like reference numerals throughout the figures for consistency.

Figure 2:
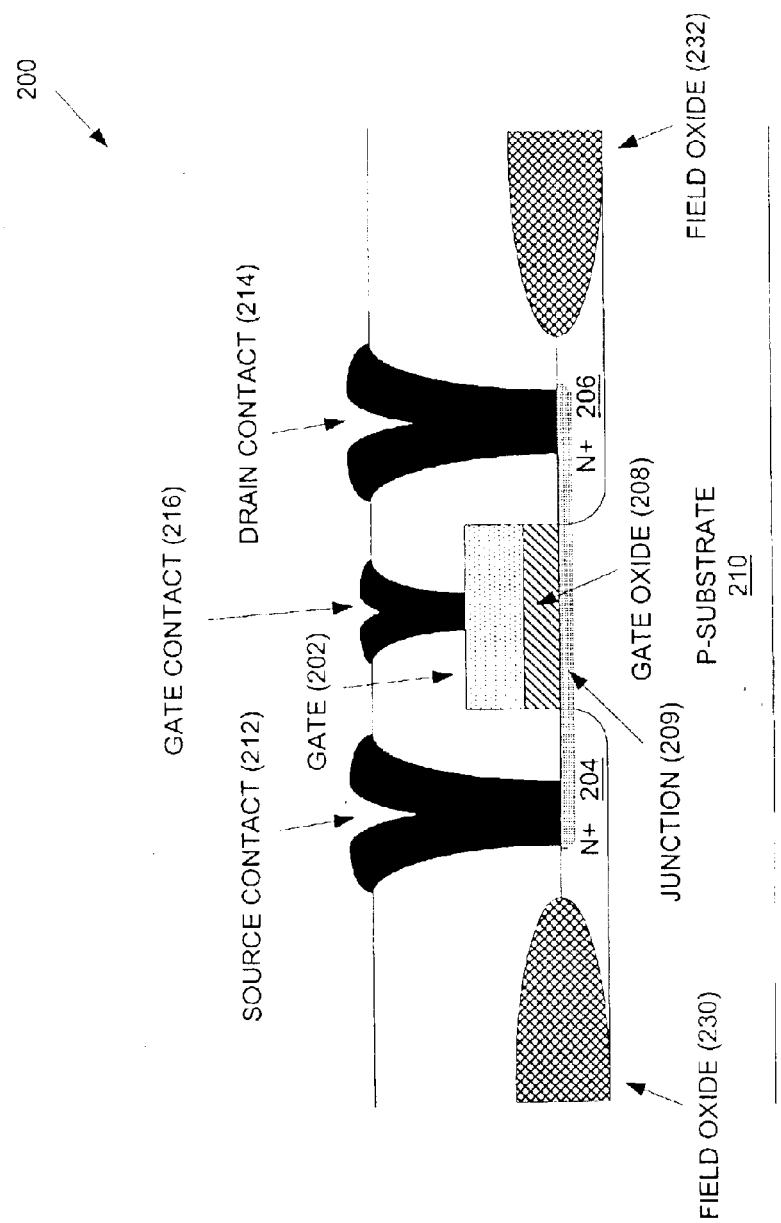
FIG. 2 shows a cross sectional diagram of a typical p-channel transistor.
Figure 3:
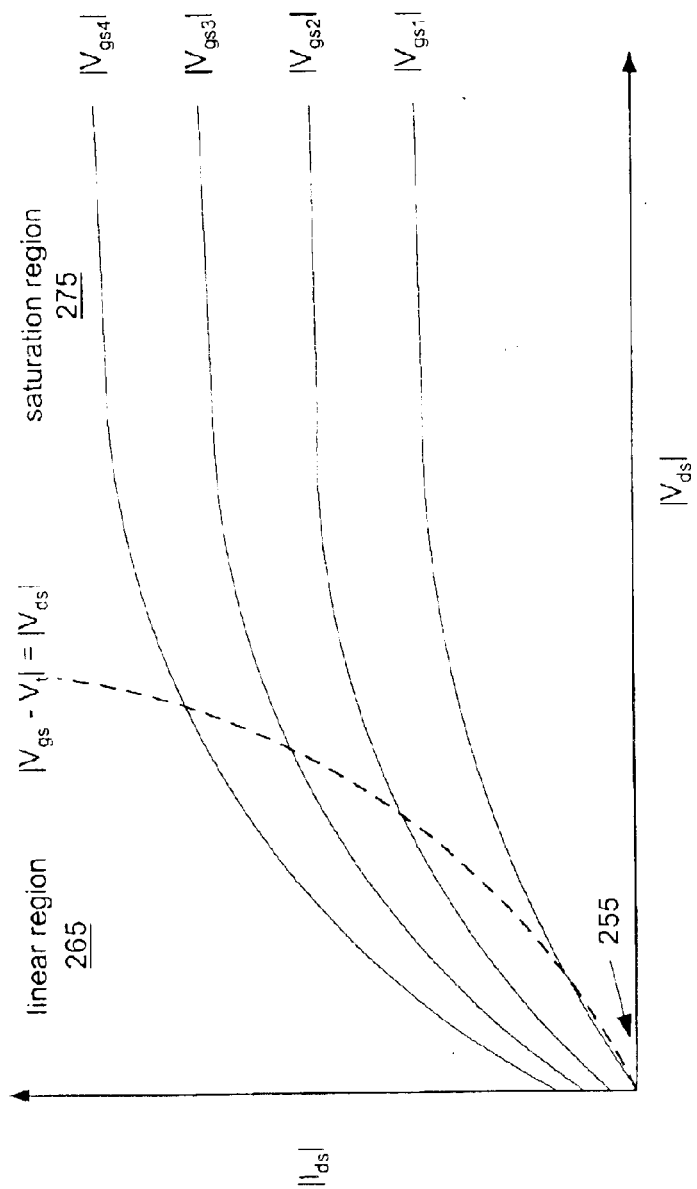
FIG. 3 shows a diagram of a current-voltage characteristic for a typical metal-oxide transistor.

As circuit elements (i.e., n-channel and/or p-channel transistors) in an IC (e.g., 16 shown in FIG. 1) continue to get smaller, one effect is that the gate oxide thickness (208 shown in FIG. 2) becomes thinner. The thin gate oxide thickness may cause a threshold voltage potential to vary, or "age," over time. As a transistor ages with time, the threshold voltage potential of the transistor may increase. Accordingly, aging of a transistor may affect critical circuits, thereby adversely impacting IC performance.

Also, as circuit elements (i.e., transistors) get smaller, a channel formed for conduction of current between the n+ regions (204, 206 shown in FIG. 2) may have a junction (209) thickness that is thinner relative to prior generation transistors. Furthermore, a depth of the two n+ regions (204, 206 shown in FIG. 2) implanted in a p-substrate (210 shown in FIG. 2) or a p-well may cause a junction (209) thickness that is thinner relative to prior generation transistors. Similarly, n-channel transistors may have a thin junction thickness. A thin junction (209) thickness formed by the channel and shallower implant regions (to form a source and drain region of a transistor) may cause a transistor to "age" over time. Aging may affect one or more operational characteristics of a transistor as time elapses from when the transistor was manufactured. Accordingly, aging of a transistor may affect critical circuits, thereby adversely impacting IC performance.

Furthermore, as circuit elements continue to get smaller and as more and more circuit elements are packed onto a single IC, ICs (16 shown in FIG. 1) dissipate increased amounts of power, effectively causing the ICs (16 shown in FIG. 1) to become hotter. Consequently, increased operating temperatures create a propensity for performance reliability degradation. Thus, it is becoming increasingly important to know the temperature parameters in which a particular IC operates properly.

The temperature level in a microprocessor (12 shown in FIG. 1) is typically measured by producing a voltage potential proportional to a temperature, i.e., a temperature dependent voltage potential. Also, the microprocessor (12 shown in FIG. 1) may produce a temperature independent voltage potential, i.e., a voltage potential insensitive to temperature, that can be compared with the temperature dependent voltage potential to allow for cancellation of process and power supply variations. One method of generating a temperature independent voltage potential and temperature dependent voltage potential is with a circuit known in the art as a temperature independent voltage generator and temperature dependent voltage generator.

Figure 4:
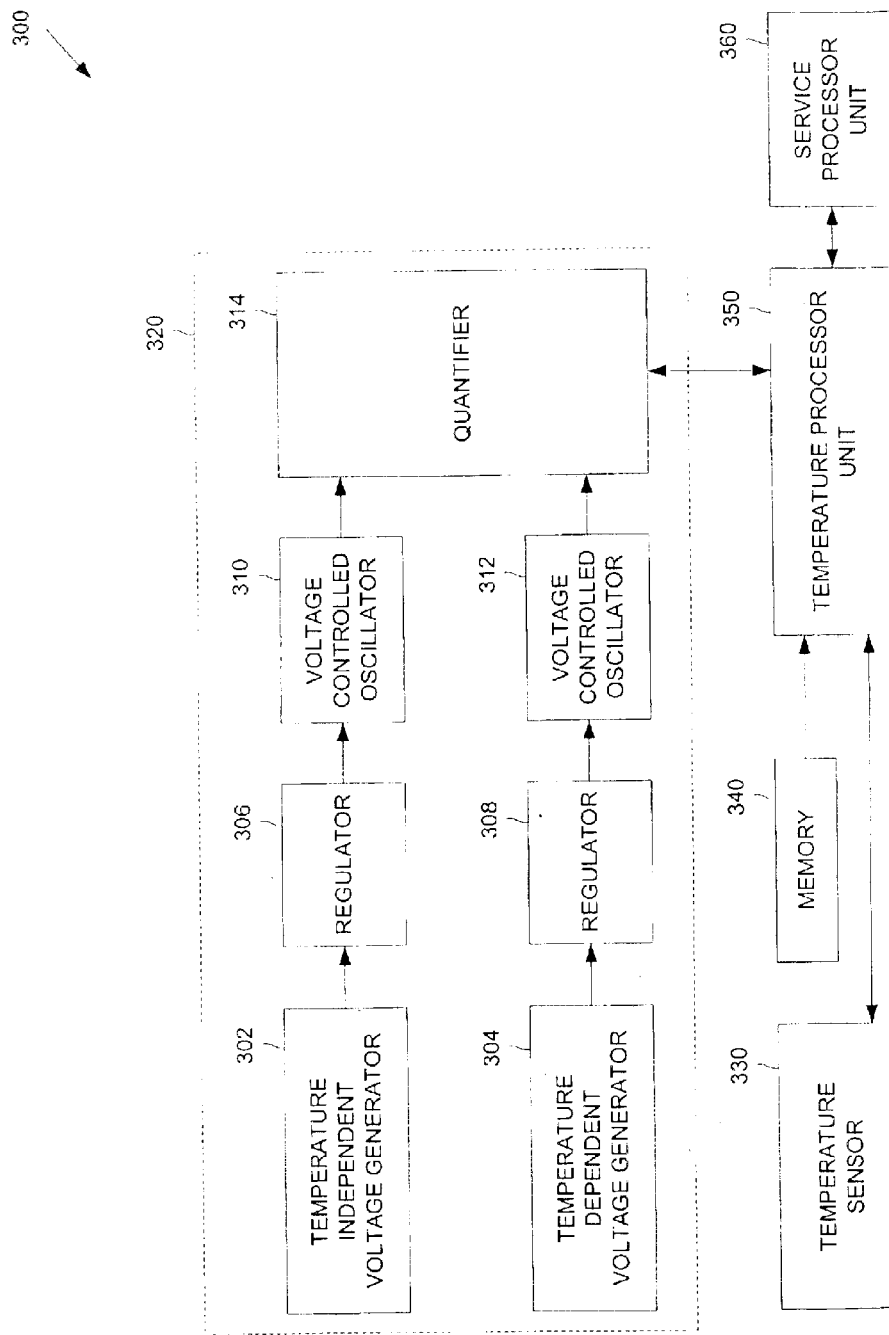
FIG. 4 shows a block diagram of a temperature monitoring system in accordance with an embodiment of the present invention.

FIG. 4 shows a block diagram of an exemplary temperature monitoring system (300) in accordance with an embodiment of the present invention. The temperature monitoring system (300) includes a first temperature sensor (320) and a second temperature sensor (330). The first temperature sensor (320) and the second temperature sensor (330) include similar elements.

In a temperature sensor (320, 330), a temperature independent voltage generator (302) generates a voltage potential that is approximately constant with respect to temperature and a power supply voltage applied to a microprocessor. In one or more other embodiments, the temperature independent voltage generator (302) may generate a voltage potential that does not remain approximately constant; however, variations are accounted for such that a predictable estimate of a temperature may be obtained.

A temperature dependent voltage generator (304) generates a voltage potential that varies with temperature. The generated voltage potential from the temperature dependent voltage generator (304) should vary with temperature, but not with time. The use of smaller circuit elements may introduce new problems. For example, the temperature dependent voltage generator (304) may use thin gate oxide thickness n-channel and/or p-channel transistors. Furthermore, thin junction thickness n-channel and/or p-channel transistors may be used. Aging of the p-channel and/or n-channel transistors may occur, thereby skewing a temperature calibration over a lifetime, or other period of time, of an IC. Accordingly, thick gate oxide p-channel and/or n-channel transistors may be used in the temperature dependent voltage generator (304) to prevent the effect of aging. Furthermore, thick junction thickness regions for p-channel and/or n-channel may be used in the temperature dependent voltage generator (304) to prevent the effect of aging. For the purposes of the present invention, a thick gate oxide transistor is a transistor with a gate oxide thickness at least 15% greater than a thin gate oxide transistor. Additionally, for the purposes of the present invention, a thick junction thickness transistor is a transistor with a junction thickness at least 15% greater than a thin junction thickness transistor.

The temperature independent voltage generator (302) and temperature dependent voltage generator (304) connect to regulators (306, 308), respectively. The regulators (306, 308) are linear voltage regulators such that a voltage potential is output dependent on an input voltage potential. The output voltage potential generated by the regulators (306, 308) is regulated using the output voltage potential as a feedback signal (not shown). By incorporating regulators (306, 308) into the temperature sensors (320, 330), the amount of noise present in a temperature measurement of an IC may be reduced. Further, because the linear regulators (306, 308) use feedback to regulate the output voltage potential, the output voltage potential for a given input voltage potential may be maintained at a substantially constant value over a wide range of power supply variations.

The regulators (306, 308) connect to voltage controlled oscillators (310, 312), respectively. The voltage controlled oscillators (310, 312) generate an oscillating signal with a frequency dependent on an input voltage. The voltage controlled oscillators (310, 312) may use thin gate oxide transistors. The thin gate oxide transistors may "age," thereby skewing the frequency of the oscillating signal over a lifetime of an IC. Accordingly, thick gate oxide p-channel transistors may be used in the voltage controlled oscillators (310, 312) to prevent the aging effect. Furthermore, thick junction thickness regions for p-channel and/or n-channel may be used in the voltage controlled oscillators (310, 312) to prevent the effect of aging.

In an embodiment of the present invention, the temperature independent voltage generator (302) generates a voltage potential greater than a voltage potential generated by the temperature dependent voltage generator (304) over a desired temperature range. Accordingly, an oscillating signal generated by the voltage controlled oscillator (310) will have a higher frequency than an oscillating signal generated by the voltage controlled oscillator (312).

The voltage controlled oscillators (310, 312) connect to a quantifier (314). The quantifier (314) may use counters to count a desired number of oscillations generated by the voltage controlled oscillators (310, 312). When a desired count is obtained from the voltage controlled oscillator (310), a count for the voltage controlled oscillator (312) is stopped. A value representing the number of counts for the voltage controlled oscillator (312) is used to indicate a temperature. In effect, the quantifier (314) operatively compares a frequency difference between an output of the voltage controlled oscillator (310) and an output of the voltage controlled oscillator (312). Furthermore, by comparing the frequency difference between the oscillating signals generated from the voltage controlled oscillator (310) and the voltage controlled oscillator (312), the quantifier (314) operatively compares a voltage potential difference between an output of the temperature independent voltage generator (302) and an output of the temperature dependent voltage generator (304).

The quantifier (314) may be reset such that temperature values may be obtained at different times while a microprocessor is powered or otherwise in operation. A temperature processor unit (350) may be used to coordinate activities of resetting the quantifier (314), waiting for a temperature to be obtained, and calculating a calibrated temperature. The temperature processor unit (350) may access multiple temperature sensors, e.g., temperature sensors (320, 330).

Process variations in a manufacture of a microprocessor may create variations in a reported temperature value. Accordingly, a memory (340) is used to store calibration information for use by the temperature processor unit (350). A microprocessor may be operated in a known environment such that a reported temperature value from a temperature sensor (320, 330) may be compared to a temperature reference value related to the known environment. A value may be stored in the memory (340) that is representative of a difference between the reported temperature value and the temperature reference value. By storing in memory (340) information from at least two calibration temperatures, a linear interpolation may be used to approximate the variations in the reported temperature value. In other words, information stored in the memory (340) is used by the temperature processor unit (350) to calibrate the temperature values reported by the temperature sensors (320, 330).

In FIG. 4, a service processor unit (360) may allow communication with a host computer (not shown). The service processor unit (360) may set conditions, perform operations, and/or report results to the host computer. Accordingly, the service processor unit (360) may communicate with the temperature processor unit (350) to report temperature values from the temperature sensors (320, 330). The service processor unit (360) and temperature processor unit (350) may be used to determine the calibration values to be stored in the memory (340). The memory (340) may store information written by the temperature processor unit (350), the service processor unit (360), or by an external means, such as a laser used to blow fuses.

Figure 5:
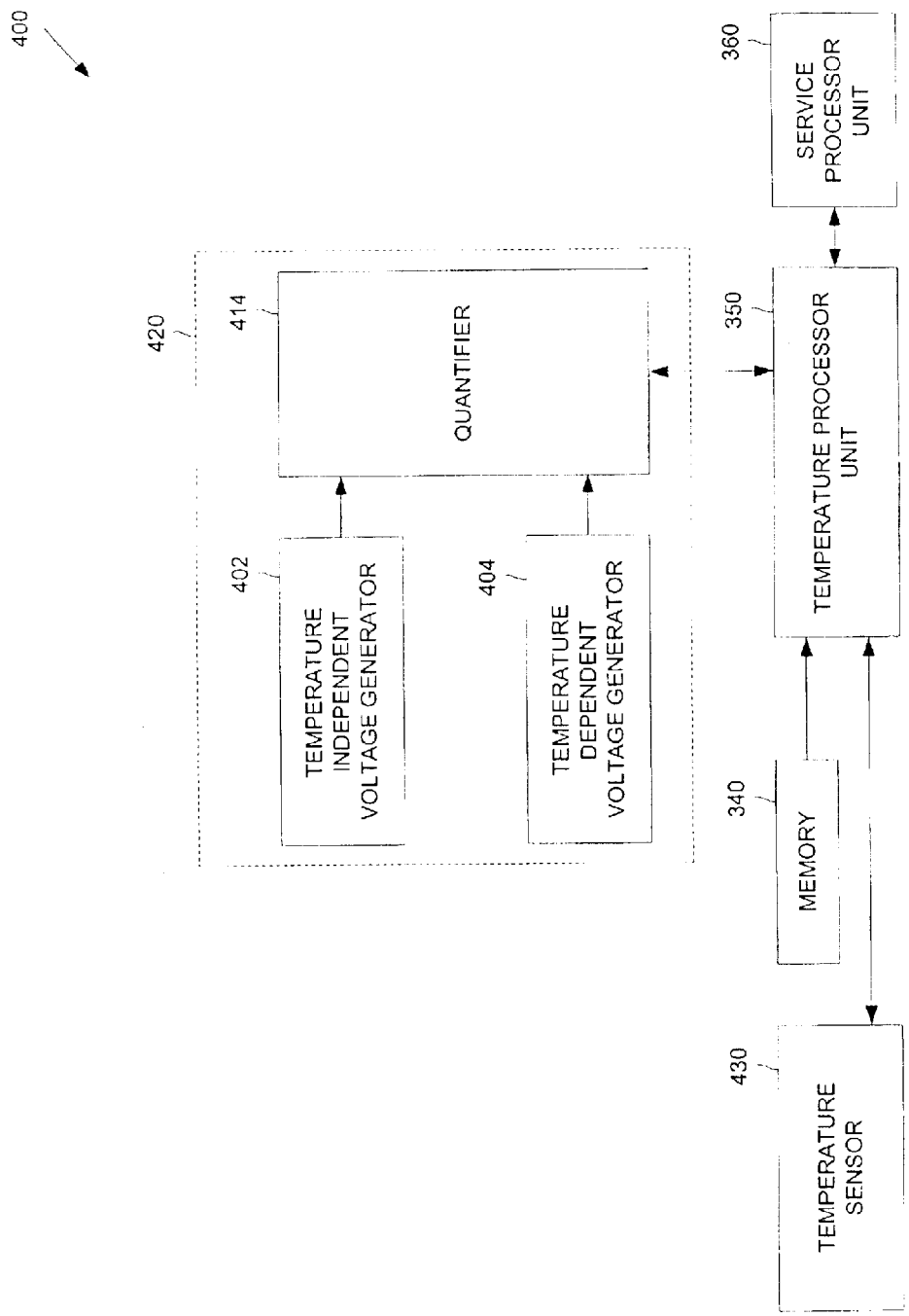
FIG. 5 shows a block diagram of a temperature monitoring system in accordance with an embodiment of the present invention.

FIG. 5 shows a block diagram of an exemplary temperature monitoring system (400) in accordance with an embodiment of the present invention. The temperature monitoring system (400) includes a first temperature sensor (420) and a second temperature sensor (430). The first temperature sensor (420) and the second temperature sensor (430) include similar elements.

In a temperature sensor (420, 430), a temperature independent voltage generator (402) generates a voltage potential that is approximately constant with respect to temperature and a power supply voltage applied to a microprocessor. In one or more other embodiments, the temperature independent voltage generator (402) may generate a voltage potential that does not remain approximately constant; however, variations are accounted for such that a predictable estimate of a temperature may be obtained.

A temperature dependent voltage generator (404) generates a voltage potential that varies with temperature. The generated voltage potential from the temperature dependent voltage generator (404) should vary with temperature, but not with time. The use of smaller circuit elements may introduce new problems. For example, the temperature dependent voltage generator (404) may use thin gate oxide thickness n-channel and/or p-channel transistors. Furthermore, thin junction thickness n-channel and/or p-channel transistors may be used. Aging of the p-channel and/or n-channel transistors may occur, thereby skewing a temperature calibration over a lifetime, or other period of time, of an IC. Accordingly, thick gate oxide p-channel and/or n-channel transistors may be used in the temperature dependent voltage generator (404) to prevent the effect of aging. Furthermore, thick junction thickness regions for p-channel and/or n-channel may be used in the temperature dependent voltage generator (404) to prevent the effect of aging. For the purposes of the present invention, a thick gate oxide transistor is a transistor with a gate oxide thickness at least 15% greater than a thin gate oxide transistor. Additionally, for the purposes of the present invention, a thick junction thickness transistor is a transistor with a junction thickness at least 15% greater than a thin junction thickness transistor.

The temperature independent voltage generator (402) and temperature dependent voltage generator (404) connect to a quantifier (414). The quantifier (414) operatively compares a voltage potential difference between an output of the temperature independent voltage generator (402) and an output of the temperature dependent voltage generator (404). The quantifier (414) may use one or more analog to digital circuits (not shown) to convert a voltage potential from the temperature independent voltage generator (402), a voltage potential from the temperature dependent voltage generator (404), and/or a voltage potential difference between an output of the temperature independent voltage generator (402) and an output of the temperature dependent voltage generator (404) into a digital value.

The quantifier (414) may be reset such that temperature values may be obtained at different times while a microprocessor is powered or otherwise in operation. Similarly, the quantifier (414) may continuously produce a temperature value that may be obtained at different times while a microprocessor is powered. A temperature processor unit (350) may be used to coordinate activities of resetting the quantifier (414), waiting for a temperature to be obtained, and calculating a calibrated temperature. The temperature processor unit (350) may access multiple temperature sensors, e.g., temperature sensors (420, 430).

The temperature processor unit (350), a memory (340), and a service processor unit (460) work similarly to like elements shown and described with respect to FIG. 4.

One of ordinary skill in the art will understand that purely digital circuits may not be as adversely effected as analog circuits by using thin gate oxide thickness transistors and/or thin junction thickness transistors. Accordingly, certain transistors within a temperature sensor (320, 330, 420, 430) may be thin gate oxide transistors and/or thin junction thickness transistor. Furthermore, some or all of the transistors in a memory (340), temperature processor unit (350), and service processor unit (360) may be thin gate oxide transistors and/or thin junction thickness transistors.

One of ordinary skill in the art will understand that an aging affect may not occur in n-channel transistors. Accordingly, thin gate oxide transistors and/or thick junction thickness n-channel transistors may be used in a temperature monitoring system. Furthermore, design and/or processing considerations may result in thick gate oxide n-channel transistors and/or thick junction thickness n-channel transistors being used in a temperature monitoring system.

Advantages of the present invention may include one or more of the following. In some embodiments, because thick gate oxide transistors are used in a temperature monitoring system, aging may not affect a gate voltage potential of the transistors. Accordingly, a temperature calibration may not skew over a lifetime, or other time period, of an IC.

In some embodiments, because thick junction thickness transistors are used in a temperature monitoring system, aging may not affect the temperature monitoring system. Accordingly, a temperature calibration may not skew over a lifetime, or other time period, of an IC.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
    an integrated circuit, wherein the integrated circuit comprises a thin gate oxide transistor; and
    a temperature monitoring system disposed on the integrated circuit, comprising:
        a first temperature independent voltage generator,
        a first temperature dependent voltage generator, wherein the first temperature dependent voltage generator comprises a thick gate oxide transistor, the thick gate oxide transistor having a gate oxide thickness at least 15% greater than a gate oxide thickness of the thin gate oxide transistor; and
        a first quantifier operatively connected to the first temperature independent voltage generator and the first temperature dependent voltage generator.

2. The apparatus of claim 1, wherein the first quantifier is operatively arranged to compare an output of the first temperature independent voltage generator and an output of the first temperature dependent voltage generator to determine a voltage potential difference.

3. The apparatus of claim 2, wherein the first quantifier comprises a thick gate oxide transistor.

4. The apparatus of claim 1, the temperature monitoring system further comprising:
    a first voltage controlled oscillator, wherein the first voltage controlled oscillator is operatively connected to the first temperature dependent voltage generator and the first quantifier, and wherein the first voltage controlled oscillator comprises a thick gate oxide transistor; and
    a second voltage controlled oscillator, wherein the second voltage controlled oscillator is operatively connected to the first temperature independent voltage generator and the first quantifier, and wherein the second voltage controlled oscillator comprises a thick gate oxide transistor.

5. The apparatus of claim 4, wherein the first quantifier is operatively arranged to compare an output of the first voltage controlled oscillator and an output of the second voltage controlled oscillator to determine a frequency difference.

6. The apparatus of claim 5, wherein the first quantifier comprises a thick gate oxide transistor.

7. The apparatus of claim 4, the temperature monitoring system further comprising:
    a first regulator, wherein the first regulator is operatively connected to the first temperature dependent voltage generator and the first voltage controlled oscillator, and wherein the first regulator comprises a thick gate oxide transistor; and
    a second regulator, wherein the second regulator is operatively connected to the first temperature independent voltage generator and the second voltage controlled oscillator, and wherein the second regulator comprises a thick gate oxide transistor.

8. The apparatus of claim 1, the temperature monitoring system further comprising:
    a temperature processor unit operatively connected to the first quantifier.

9. The apparatus of claim 8, wherein the temperature processor unit comprises a thin gate oxide transistor.

10. The apparatus of claim 8, the temperature monitoring system further comprising:
    a memory operatively connected to the temperature processor unit.

11. The apparatus of claim 10, wherein the memory is arranged to maintain information for at least two calibration temperatures.

12. The apparatus of claim 8, the temperature monitoring system further comprising:
    a service processor operatively connected to the temperature processor unit.

13. The apparatus of claim 12, wherein the service processor comprises a thin gate oxide transistor.

14. The apparatus of claim 1, the temperature monitoring system further comprising:
    a second temperature independent voltage generator;
    a second temperature dependent voltage generator, wherein the second temperature dependent voltage generator comprises a thick gate oxide transistor; and
    a second quantifier operatively connected to the second temperature independent voltage generator and second temperature dependent voltage generator.

15. The apparatus of claim 14, further comprising:
    a third voltage controlled oscillator, wherein the third voltage controlled oscillator is operatively connected to the second temperature dependent voltage generator and the second quantifier, and wherein the third voltage controlled oscillator comprises a thick gate oxide transistor; and
    a fourth voltage controlled oscillator, wherein the fourth voltage controlled oscillator is operatively connected to the second temperature independent voltage generator and the second quantifier, and wherein the fourth voltage controlled oscillator comprises a thick gate oxide transistor.

16. A method for monitoring temperature, comprising:
    generating a first temperature dependent voltage potential using at least one thick gate oxide transistor disposed on an integrated circuit having disposed thereon at least one thin gate oxide transistor, the thin gate oxide transistor having a gate oxide thickness at least 15% less than a gate oxide thickness of the thick gate oxide transistor;
    generating a first temperature independent voltage potential; and
    monitoring a temperature of the integrated circuit by operatively comparing the first temperature independent voltage potential and the first temperature dependent voltage potential.

17. The method of claim 16, further comprising:
    generating an oscillating signal with a frequency dependent on the first temperature independent voltage potential using a thick gate oxide transistor; and generating an oscillating signal with a frequency dependent on the first temperature dependent voltage potential using a thick gate oxide transistor.

18. The method of claim 17, wherein the operatively comparing comprises comparing the oscillating signal with a frequency dependent on the first temperature independent voltage potential and the oscillating signal with a frequency dependent on the first temperature dependent voltage potential.

19. The method of claim 16, comprising:
generating a second temperature independent voltage potential;
generating a second temperature dependent voltage potential using at least one thick gate oxide transistor; and
operatively comparing the second temperature independent voltage potential and the second temperature dependent voltage potential to monitor a temperature of the integrated circuit.

20. The method of claim 19, further comprising:
generating an oscillating signal with a frequency dependent on the second temperature independent voltage potential using a thick gate oxide transistor; and
generating an oscillating signal with a frequency dependent on the second temperature dependent voltage potential using a thick gate oxide transistor.

21. The method of claim 20, the operatively comparing comprises comparing the oscillating signal with a frequency dependent on the second temperature independent voltage potential and the oscillating signal with a frequency dependent on the second temperature dependent voltage potential.

22. An apparatus, comprising:
an integrated circuit comprising a thin gate oxide transistor;
means for generating a first temperature independent voltage potential on the integrated circuit;
means for generating a first temperature dependent voltage potential based on a temperature of the integrated circuit using at least one thick gate oxide transistor, the thick gate oxide transistor having a gate oxide thickness at least 15% greater than a gate oxide thickness of the thin gate oxide transistor; and
means for operatively comparing the first temperature independent voltage potential and the first temperature dependent voltage potential to monitor the temperature of the integrated circuit.

23. The apparatus of claim 22, further comprising:
means for generating a second temperature independent voltage potential;
means for generating a second temperature dependent voltage potential using at least one thick gate oxide transistor; and
means for operatively comparing the second temperature independent voltage potential and the second temperature dependent voltage potential to monitor a temperature of the integrated circuit.

24. An apparatus, comprising:
an integrated circuit, wherein the integrated circuit comprises a thin junction thickness transistor and a thick junction thickness transistor, the thick junction thickness transistor having a junction thickness at least 15% greater than a junction thickness of the thin junction thickness transistor; and
a temperature monitoring system disposed on the integrated circuit, comprising:
a temperature independent voltage generator,
a temperature dependent voltage generator, wherein the temperature dependent voltage generator comprises a thick junction thickness transistor; and
a quantifier operatively connected to the temperature independent voltage generator and the temperature dependent voltage generator.

25. The apparatus of claim 24, the temperature monitoring system further comprising:
a first voltage controlled oscillator, wherein the first voltage controlled oscillator is operatively connected to the temperature dependent voltage generator and the quantifier, and wherein the first voltage controlled oscillator comprises a thick junction thickness transistor; and
a second voltage controlled oscillator, wherein the second voltage controlled oscillator is operatively connected to the temperature independent voltage generator and the quantifier, and wherein the second voltage controlled oscillator comprises a thick junction thickness transistor.

* * * * *

UNITED STATES PATENT AND TRADEMARK OFFICE
CERTIFICATE OF CORRECTION

PATENT NO. : 6,814,485 B2
DATED : November 9, 2004
INVENTOR(S) : Claude R. Gauthier et al.

It is certified that error appears in the above-identified patent and that said Letters Patent is hereby corrected as shown below:

<u>Column 9,</u>
Line 27, please place -- wherein -- in front of "the".

Signed and Sealed this

Fifth Day of April, 2005

JON W. DUDAS
*Director of the United States Patent and Trademark Office*